Oct. 26, 1926.
P. C. A. VAN DER MEER
1,604,860
FLOOR LOADING DEVICE
Filed April 3, 1925　　2 Sheets-Sheet 1
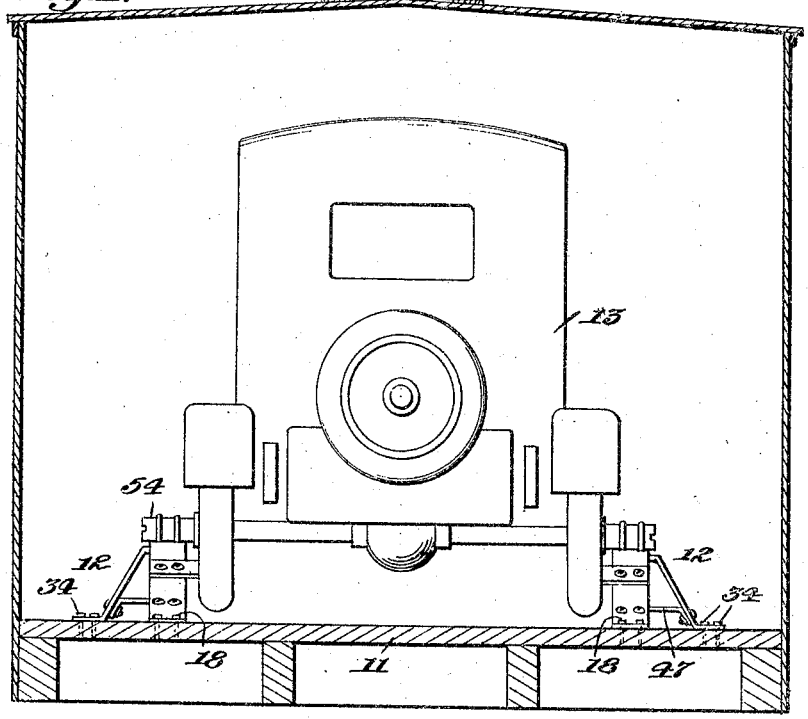
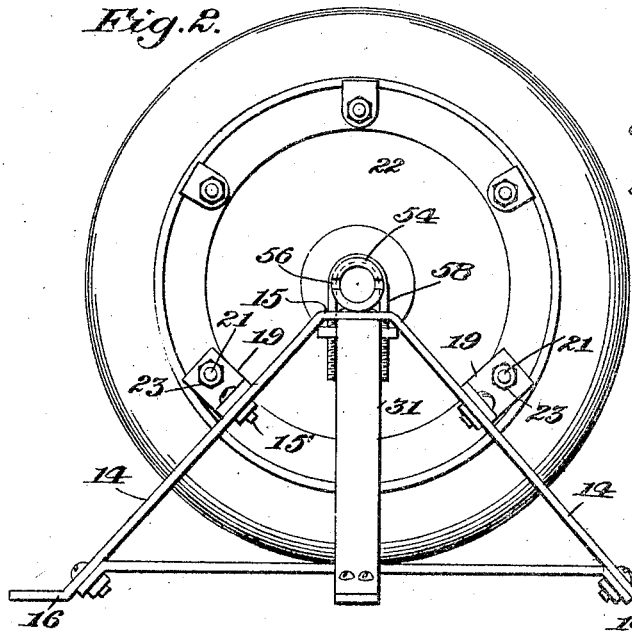
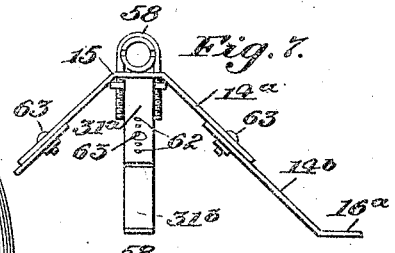
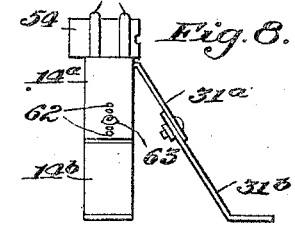
Inventor:
Peter C. A. van der Meer,
Joseph W. Hazell
Att'y.

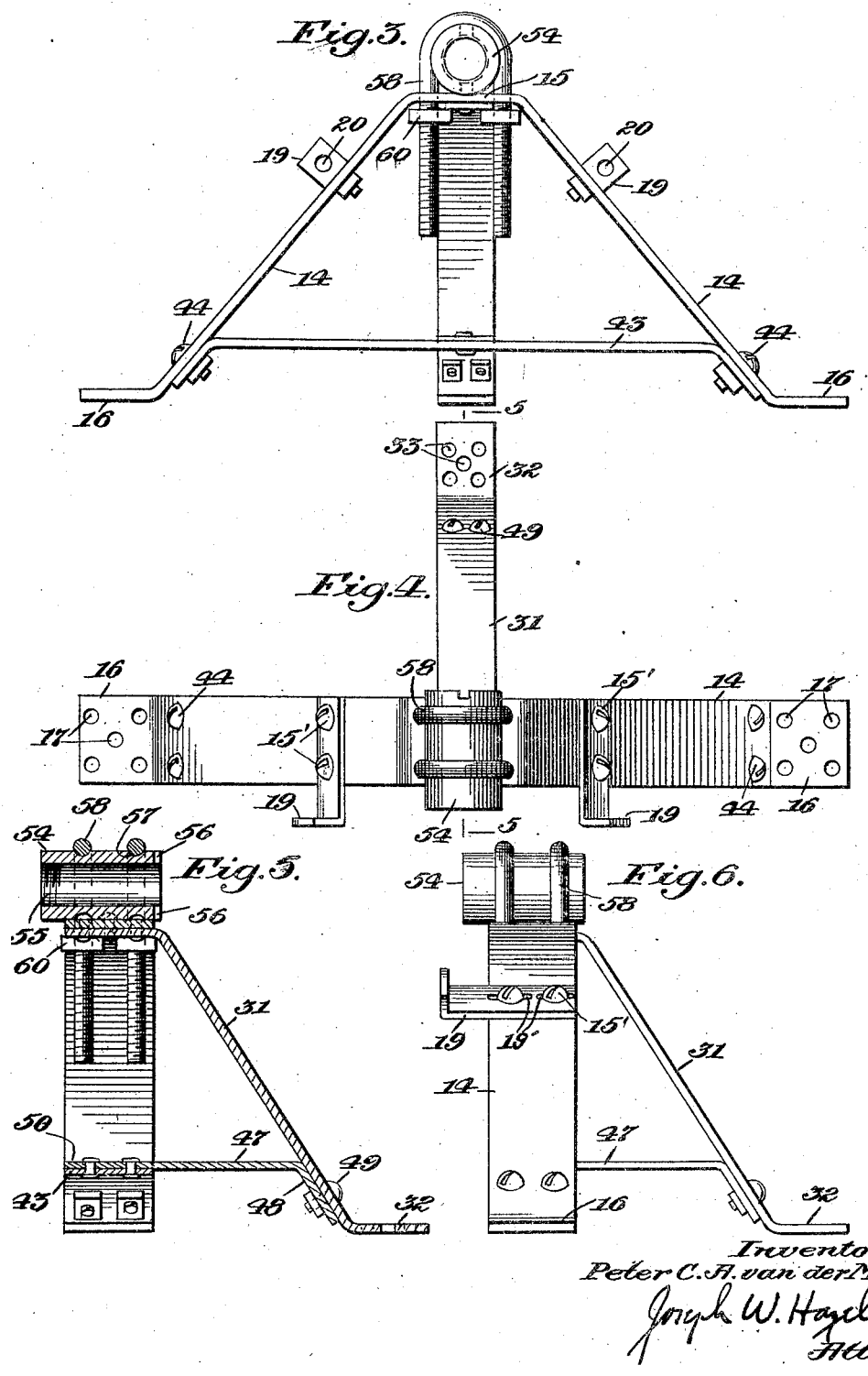

Patented Oct. 26, 1926.

1,604,860

UNITED STATES PATENT OFFICE.

PETER C. A. VAN DER MEER, OF DETROIT, MICHIGAN, ASSIGNOR TO VANHOLTITE AUTOMOBILE APPLIANCES, INCORPORATED, A CORPORATION OF MASSACHUSETTS.

FLOOR LOADING DEVICE.

Application filed April 3, 1925. Serial No. 20,422.

The present invention relates to floor loading devices and particularly to supporting braces used in connection with a shipment of automobiles in freight cars.

An object of the invention is to provide a supporting brace of this type adapted to support a vehicle on the floor of a freight car and at the same time brace it against longitudinal and lateral shifting movement.

Another object of the invention is to provide such a brace that can be conveniently, inexpensively and simply constructed of strip metal.

A further object of the invention is to provide a brace or loading device for vehicles provided with means for supporting and bracing the vehicle at the hubs of the wheels and also at other points, preferably at one or more of the rim bolts of the wheels.

A still further object of the invention is to provide such a brace including what may be termed a loading hub cap adapted to replace during transportation the usual hub cap, together with means for securing, either rotatably or rigidly, said cap to the remainder of the brace.

Another object of the invention is to provide such a brace which can be raised or lowered to the desired level with respect not only to the longitudinal bracing and supporting means, but also with respect to the lateral bracing and supporting means.

Other objects and advantages of the invention will in part be apparent and in part appear from the following detailed description taken in connection with the accompanying drawings, which illustrate, by way of example, preferred embodiments of the invention and in which:

Fig. 1 is a transverse vertical section through a portion of a conventional freight car showing therein an automobile loaded, braced and supported by one form of the present invention;

Fig. 2 is a side elevation on an enlarged scale showing the supporting brace and a vehicle wheel loaded thereon;

Fig. 3 is a side elevation similar to Fig. 2, but without the wheel and showing the loading device from the other side;

Fig. 4 is a top plan view of the loading device;

Fig. 5 is a vertical section thereof taken on the line 5—5 of Fig. 4;

Fig. 6 is an end elevation of the loading device;

Fig. 7 is a side elevation on a reduced scale and partly broken away showing another embodiment of the invention; and Fig. 8 is an end elevation of the embodiment shown in Fig. 7.

Referring in detail to the drawings, the reference numeral 11 indicates a floor of a conventional form of freight car provided with a plurality of loading devices 12 adapted to support and brace an automobile 13 for transportation.

The supporting device is shown as comprising a metal strip bent as shown in the drawings to form two longitudinal supporting and bracing legs 14 with an intermediate bearing portion 15, each of said legs being provided with horizontally extending feet 16 provided with bolt or screw holes 17 adapted to receive bolts or screws 18 or other securing means for fastening said feet rigidly to the floor 11.

Each of the legs 14 is provided with a lateral brace 19 shown as having the form of an angularly bent metal strip secured to the legs 14 by screw bolts 15'. A part of each lateral brace 19 preferably lies in a vertical plane and is provided with an opening 20 adapted to receive one of the rim bolts 21 of an automobile or other vehicle wheel 22, said rim bolts being secured to said lateral bracing means by nuts 23 or other suitable fastening means. The function of the lateral braces shown abutting against the wheel where the rim bolts are located and preferably receiving the rim bolts, is to prevent any change in the planar direction of the wheel. This is important because in the case of the front wheels, these are secured by vertical pins to the stationary axles, and where a vehicle is supported by the hubs of the wheels and is subjected to a shock in a longitudinal direction, owing to the tremendous weight of the vehicle between the hubs, there is a tendency for the body of the vehicle to move forwardly and a drag on the wheel hubs tending to prevent this movement. The result is that where no means is provided to prevent the wheels from spreading, the wheels will spread under such shock. The present invention provides means for preventing this spreading of the wheels in the form of abutment members which maintain the wheel in a fixed plane when the vehicle is subjected to shock.

A lateral brace 31, preferably consisting of a metal strip bent as shown in the drawings, has one of its ends secured to the bearing portion 15 of the loading device preferably on the underside thereof and has its other end formed as a horizontal foot 32 provided with openings 33 adapted to receive bolts, screws, or other securing means 34 adapted to fasten said lateral brace 31 to the floor 11, as shown in Fig. 1.

A longitudinal connecting brace 43, preferably consisting of an angularly bent metal strip as shown in the drawings, connects the longitudinal legs 14 preferably near the feet thereof and has its ends secured to said legs by screw bolts 44 or other suitable means. A lateral brace 47, preferably consisting of a metal strip bent as shown in the drawings, has one of its ends 48 secured to the lateral brace 31 by a screw bolt 49 or other securing means and has its other end 50 riveted or otherwise secured to the longitudinal connecting brace 43.

The bearing portion 15 is provided with a temporary or loading hub cap 54, which may conveniently have the form of a socket or open cylinder threaded at one of its ends 55 for the reception of the screw threads on the hub of a vehicle wheel, the usual hub cap being temporarily removed for this purpose, and the other end of the loading hub cap may conveniently be provided with some means for facilitating its rotation, such, for example, as the diametrically opposed notches 56 adapted to receive a suitable tool.

The loading hub cap 54 is secured during transportation to the remaining portion of the loading device by any convenient means, and for this purpose the loading hub cap is preferably provided with one or more external annular grooves 57. The grooved portion or portions of the loading hub cap are embraced by U-bolts, which have their ends passing through the bearing portion 15 and screw threaded for the reception of clamping and securing nuts 60.

The operation of the device is as follows: When the automobile or other vehicle is to be shipped, its hub caps are removed and replaced by the loading hub caps 54, after which the vehicle is placed in position between opposed loading devices, as shown in Fig. 1, of which preferably four are used for each vehicle. The bearing portion 15 of each loading device is preferably sufficiently far above the floor to permit the wheels of the vehicle to be raised entirely off the floor, as shown in Fig. 1. The loading devices are each screwed or otherwise secured to the floor, as shown in Fig. 1, and it will be noted that each loading device is secured to the floor not only at the feet of the longitudinal supporting legs 14, but also at the foot of the lateral brace 31. It will also be noted that the loading hub caps 54, being rotatable on the bearing portion 15 within their clamping U-bolts 58, may be screwed on the hubs either before or after the automobile or other vehicle is placed in position between the loading devices.

When its destination is reached, the vehicle is removed and the loading hub caps are replaced by the usual hub caps.

When in loaded position the weight of the automobile is distributed on the bearing portions 15, which are supported and braced by the longitudinal legs 14 and are additionally supported and braced laterally by the lateral brace 31. When in loaded position, longitudinal movement of the loaded vehicle is prevented by the loading hub cap bearing on the clamping U-bolts in a radial direction with respect to said hub cap and lateral movement of the loaded vehicle is prevented by the engagement of the grooved portion or portions of the loading hub cap with the U-bolt or U-bolts 58 thrusting thereagainst in an axial direction with respect to said hub cap. If it is desired to rotate the loading hub cap on the hub screw threads when the vehicle is in loaded position, this may be accomplished by loosening or removing the clamping U-bolts.

It will also be noted that the longitudinal supporting legs 14 are braced by the longitudinal brace 43, which in turn is braced to the lateral supporting leg 31 by the lateral brace 47.

Referring now to the embodiment of the invention shown in Figs. 7 and 8, the loading hub cap, the clamping U-bolts and the bearing portion are preferably the same as those above described. The longitudinal legs, however, are made in sections $14^A$ and $14^B$, the lower end of the sections $14^B$ being provided with horizontal feet $16^A$ similar to the feet 16, and the joining portions of both sections $14^A$ and $14^B$ being provided with a plurality of bolt holes 62 adapted to receive one or more bolts 63 or other securing means for rigidly joining said sections. The lateral supporting leg similarly consists of two sections $31^A$ and $31^B$, the joining portions of which are similarly provided with bolt holes 62 and one or more bolts 63. By means of this construction the height or level of the bearing portion 15, on which the loading hub cap rests, may be regulated before the loading device as a whole is secured to the floor 11, as shown in Fig. 1. The embodiment of the invention shown in Figs. 7 and 8 may or may not be provided with rim-bolt securing means such as is shown in Figs. 1 to 6 inclusive, and if such braces are provided, they may be made adjustable on the supporting and bracing legs either by a plurality of bolt holes or by bolt and slot connections, such as the two bolts shown or a slot in one member to which the other is secured by a bolt, a form of which connection is illustrated by way of example in Fig. 6, the slot being numbered 19'. In adjusting, of course, it will be obvious that only one bolt need be used where the slot is provided. This form of adjustability is desirable for the purpose of advancing the rim bolt braces toward and away from the vehicle wheel.

It will be apparent to those skilled in the art that various changes and modifications may be made in the constructions above described without departing from the invention as defined in the appended claims.

I claim—

1. A vehicle loading device including a brace having, in combination therewith, means for receiving the hub of a vehicle wheel and means associated with said wheel remote from said hub for maintaining said wheel in a fixed plane.

2. A vehicle loading device including, in combination, a wheel hub receiving and supporting member and means adapted to contact with said wheel for preventing said wheel from changing its planar direction.

3. A vehicle loading device including a wheel hub engaging and supporting portion, and spaced wheel abutment braces co-operating therewith for maintaining said wheel in a fixed plane.

4. A vehicle bracing support including, in combination, a vehicle wheel hub receiving portion adapted to take longitudinal and lateral thrust of said vehicle under shock, and spaced wheel abutment braces adapted to maintain said wheel in a fixed plane, said braces being adjustable toward and away from said vehicle wheel.

5. A vehicle bracing support having, in combination, a vehicle wheel hub receiving portion adapted to take longitudinal and lateral thrust of said vehicle as a whole under shock, and rim bolt receiving wheel abutment means adapted to prevent said wheel from changing its planar direction when said vehicle is subjected to shock.

6. In combination, a pair of legs spaced at their bottoms and converging at their tops, means carried on the top of said legs for engaging a vehicle and straps on said legs adjacent their tops for engaging a vehicle wheel.

In testimony whereof I affix my signature.

PETER C. A. VAN DER MEER.